(12) United States Patent
Hinterberger et al.

(10) Patent No.: US 10,340,707 B2
(45) Date of Patent: Jul. 2, 2019

(54) ADJUSTMENT OF STATES OF CHARGE OF BATTERY CELLS

(71) Applicant: AUDI AG, Ingolstadt (DE)

(72) Inventors: Michael Hinterberger, Großmehring (DE); Berthold Hellenthal, Schwanstetten (DE)

(73) Assignee: AUDI AG, Ingolstadt (DE)

( * ) Notice: Subject to any disclaimer, the term of this patent is extended or adjusted under 35 U.S.C. 154(b) by 77 days.

(21) Appl. No.: 15/551,134

(22) PCT Filed: Feb. 15, 2016

(86) PCT No.: PCT/EP2016/053168
§ 371 (c)(1),
(2) Date: Aug. 15, 2017

(87) PCT Pub. No.: WO2016/131773
PCT Pub. Date: Aug. 25, 2016

(65) Prior Publication Data
US 2018/0034290 A1 Feb. 1, 2018

(30) Foreign Application Priority Data
Feb. 18, 2015 (DE) ........................ 10 2015 002 072

(51) Int. Cl.
H01M 10/44 (2006.01)
H01M 10/46 (2006.01)
(Continued)

(52) U.S. Cl.
CPC ....... H02J 7/0024 (2013.01); H01M 10/4257 (2013.01); H01M 10/441 (2013.01);
(Continued)

(58) Field of Classification Search
CPC ...... H02J 7/0003; H02J 7/1423; H02J 7/0013; H02J 7/0014; H02J 7/0016; H02J 7/0019
(Continued)

(56) References Cited

U.S. PATENT DOCUMENTS

| 8,933,667 | B2 | 1/2015 | Park et al. | |
| 2015/0137763 | A1* | 5/2015 | Kikuchi | B60L 11/1861 320/118 |
| 2015/0162759 | A1* | 6/2015 | Fujii | H01M 10/425 320/118 |

FOREIGN PATENT DOCUMENTS

| CN | 1499692 A | 5/2004 |
| CN | 101944756 A | 1/2011 |

(Continued)

OTHER PUBLICATIONS

Examination Report dated Dec. 17, 2015 of corresponding German application No. 10 2015 002 072.2; 6 pgs.
(Continued)

Primary Examiner — Edward Tso
(74) Attorney, Agent, or Firm — Maier & Maier, PLLC

(57) ABSTRACT

A method for the adjustment of states of charge of battery cells that are operated electrically in parallel connection, with the following steps: determination of the states of charge of the battery cells; selection of those battery cells whose states of charge are to be adjusted in accordance with a predeterminable selection rule; activation of those battery cells that are adjusted by means of a respective semiconductor switch of the battery cells, and deactivation of the remaining battery cells by means of the semiconductor switches of the respective remaining battery cells; carrying out the adjustment of the states of charge and monitoring of the states of charge; and termination of the adjustment of the
(Continued)

states of charge when a predetermined state of charge has been attained by the activated battery cells.

9 Claims, 2 Drawing Sheets

(51) Int. Cl.
      *H02J 7/00*       (2006.01)
      *H01M 10/42*       (2006.01)
      *H01M 10/48*       (2006.01)

(52) U.S. Cl.
      CPC .. *H01M 10/482* (2013.01); *H01M 2010/4271* (2013.01); *H01M 2010/4278* (2013.01); *H01M 2220/20* (2013.01)

(58) Field of Classification Search
      USPC .................................. 320/107, 116, 118, 119
      See application file for complete search history.

(56) References Cited

FOREIGN PATENT DOCUMENTS

| | | |
|---|---|---|
| CN | 103915862 A | 7/2014 |
| DE | 102008060936 A1 | 6/2010 |
| DE | 102010043523 A1 | 5/2012 |
| DE | 102010061025 A1 | 6/2012 |
| DE | 102011089135 A1 | 6/2013 |
| DE | 102013104322 A1 | 12/2013 |
| DE | 102012213858 A1 | 2/2014 |
| DE | 102012214878 A1 | 2/2014 |
| DE | 102012110030 A1 | 6/2014 |
| DE | 102014200329 A1 | 7/2015 |
| EP | 1837944 A2 | 9/2007 |
| EP | 2410602 A1 | 1/2012 |
| EP | 2747238 A2 | 6/2014 |

OTHER PUBLICATIONS

Examination Report dated Oct. 31, 2016 of corresponding German application No. 10 2015 002 072.2; 5 pgs.

International Search Report dated May 10, 2016 of corresponding International application No. PCT/EP2016/053168; 19 pgs.

Notification of Transmittal of Translation of the International Preliminary Report on Patentability dated Aug. 31, 2017, in connection with corresponding international application No. PCT/EP2016/053168 (9 pages).

Chinese Office Action dated Dec. 28, 2018, in connection with corresponding CN Application No. 201680010661.X (17 pgs., including machine-generated English translation).

* cited by examiner

ADJUSTMENT OF STATES OF CHARGE OF BATTERY CELLS

FIELD

The present invention relates to a method for the adjustment of states of charge of battery cells that are operated in parallel connection. The invention also relates to a device for this as well as to a battery, in particular for utilization in a motor vehicle, having a plurality of battery cells that are electrically connected in parallel.

BACKGROUND

Methods as well as devices for the adjustment of states of charge of battery cells that are operated electrically in parallel connection are known in basic principle, so that a separate documentation of publications for this is not needed. Such battery cells or batteries are often employed in high-voltage battery systems, such as are used, for example, in electrically drivable motor vehicles or the like. In the case of battery cells that are electrically connected in series, it is known to carry out a charge equilibration with respect to the battery cells in order to reduce thereby different states of charge of the battery cells connected in series. This operation is also referred to as balancing. For this purpose, in the case of battery cells that are electrically connected in series, a respective switchable electric resistor is connected in parallel to each individual battery cell. These resistors can be activated selectively in order to be able to adjust the states of charge of the individual battery cells. For this purpose, the respective states of charge of the battery cells are recorded separately and the resistors are correspondingly activated.

For battery cells that are electrically connected in parallel, the aforementioned method cannot be used. In order to be able to achieve a charge adjustment between individual battery cells in this case, it is necessary to disconnect the particular battery cell from the assembly by switching technology and to charge or discharge it to a predetermined state of charge by means of a charging device or a discharging device. Such a method is very complex. For this reason, a balancing is not in very widespread use for battery cells connected in parallel.

A unique feature of battery cells that are electrically connected in parallel consists in the fact that all of the battery cells that are electrically connected in parallel have essentially the same electrical voltage. If, in the case of individual battery cells, even slight differences in voltage exist in relation to their respective individual no-load voltage, then, at the instant of interconnection to create a parallel circuit, a corresponding compensating current flows. The compensating current is limited via the particular internal resistances of the battery cells in question as well as by way of contact resistances between connection terminal contacts of the battery cells and an electrical connection for producing the parallel connection of the battery cells. Generally, the internal resistances of the battery cells are very small and often lie in the low million range or even below it. This effect is enhanced due to the fact that the different battery cells that are electrically connected in parallel generally have slight differences in voltage in relation to the no-load voltage. For this reason, for an identical structural design, the respective states of charge of the battery cells deviate from one another. As a result of this, it is possible to further enhance the aforementioned effect.

A battery cell is a device that has two electrodes that interact electrochemically with each other. The interaction can occur with supplemental assisting action of an electrolyte. Battery cells, which are also referred to as galvanic cells, are preferably reversible in terms of their function, such as when they are utilized, for example, for batteries in the form of rechargeable batteries. On account of the electrochemical interaction of the electrodes, a direct current voltage that is specific to the battery cell chemistry is established at the electrodes and is supplied by way of connection terminal contacts of the respective battery cell that are connected to the electrodes.

Inside the battery, the individual battery cells are often connected to one another in an electrically conductive manner by means of bus bars or similar electrical conductors in the desired type of circuit, in order to be able to supply a desired direct current voltage at the connection terminal poles of the battery together with a likewise desired ability to bear loads. Such batteries are employed, for example, as lead acid batteries in the motor vehicle sector, as nickel cadmium batteries in the aircraft sector, and, for interruption-free current supplies, as lithium ion batteries in the field of small household appliances and/or the like, but recently also in electrically driven vehicles.

Electrically drivable motor vehicles comprise, as a rule, an electrical system with a battery as well as a drive device connected to the electrical system. Such motor vehicles are, for example, electric vehicles, hybrid vehicles, in which a drive is possible both by means of an electrical drive device and also by means of an internal combustion engine, or the like. In such motor vehicles, the battery is often designed as a high-voltage battery system.

When a high-voltage battery system of a motor vehicle is utilized, energy losses arise on account of the above-described compensating currents and can be detrimental to the range of travel of the motor vehicle. More efficient battery cells are subject to greater load in regard to the battery cells, for which reason they are subject to enhanced aging. Here, too, the operational readiness of battery cells, which are electrically connected in parallel and are part of the battery, is overall reduced. In the process, it has proven to be especially detrimental that an energy balancing for producing a uniform state of charge between the respective battery cells is not possible owing to the parallel connection. For a battery having such a parallel connection of battery cells, there results a greater power loss, the overall further consequence of which can be a premature aging of the battery. Furthermore, there exists the danger of overloading battery cells of weaker power.

SUMMARY OF THE DISCLOSURE

The object of the invention is to present a method as well as a device for the adjustment of states of charge of battery cells that are operated electrically in parallel connection as well as to present a battery with which the aforementioned problems can be reduced.

Further advantageous embodiments of the invention ensue based on features of the independent claims.

The invention proposes, in particular, a method of the generic type that comprises the following steps:
- determination of the states of charge of the battery cells;
- selection of those battery cells whose states of charge are to be adjusted in accordance with a predeterminable selection rule;
- activation of those battery cells that are adjusted by means of a respective semiconductor switch of the battery cells and deactivation of the remaining battery cells by means of the semiconductor switch of the respective remaining battery cells;

carrying out the adjustment of the states of charge and monitoring the states of charge; and termination of the adjustment of the states of charge when a predetermined state of charge has been attained by the activated battery cells.

In terms of the device, it is proposed for a device of the generic type that, in particular, the device is designed to determine the states of charge of the battery cells, to select those battery cells whose states of charge are to be adjusted in accordance with a predeterminable selection rule, to activate those battery cells whose states of charge are to be adjusted by means of a respective semiconductor switch of the battery cells, and to deactivate the remaining battery cells by means of the semiconductor switches of the respective remaining battery cells, to carry out the adjustment of the states of charge and to monitor the states of charge, and to terminate the adjustment of the states of charge when a predetermined state of charge has been attained by the activated battery cells.

In terms of the battery cell, it is proposed, in particular, that the battery has a device for the adjustment of states of charge of the battery cells, which is designed to determine the states of charge of the battery cells, to select those battery cells whose states of charge are to be adjusted in accordance with a predeterminable selection rule, to activate those battery cells whose states of charge are to be adjusted by means of a respective semiconductor switch of the battery cells and to deactivate the remaining battery cells by means of the semiconductor switches of the respective remaining battery cells, to carry out the adjustment of the states of charge and to monitor the states of charge, and to terminate the adjustment of the states of charge when a predetermined state of charge has been attained by the activated battery cells.

Accordingly, it is possible with the invention, for the first time, to influence battery cells that are operated in a parallel assembly, that is, which are electrically connected in parallel, in terms of their states of charge in a way that can be predetermined. In particular, it is possible to adjust the respective state of charge of the battery cell in a desired way. Accordingly, the method of the invention is suitable not only for application in the case of a parallel connection of battery cells that are identical in structure, but can also be used advantageously when the battery cells have different capacitances, and/or the like. The method of the invention makes possible a dynamic adjustment, so that the battery cells can be operated in a manner that is as optimal as possible. As a result of this, the availability of electrical energy is maximized and/or an aging is reduced. A state of charge in terms of the invention gives a value for the electric charge that is stored in an available manner in a respective battery cell. Differing from this is a state of capacitance, the value of which is a measure of the maximum electrical charge than can be stored reversibly in the battery cell.

The invention enables an active balancing of battery cells that are electrically connected in parallel and, namely, does so with the aid of switchable battery cells, that is, battery cells that have a semiconductor switch by which they can be activated or deactivated. By means of the semiconductor switch, it is possible to make a switchable electric connection between an electrode and an associated connection terminal contact of the battery cell. A semiconductor switch in terms of this disclosure is a controllable electronic switching element, such as, for example, a transistor, a thyristor, combination switches thereof, in particular with flyback diodes connected in parallel, such as, for example, a metal-oxide semiconductor field-effect transistor (MOSFET), an isolated gate bipolar transistor (IGBT), preferably with an integrated flyback diode, or the like.

The semiconductor switches, which are preferably arranged in the particular battery cell in an integrated manner, can be controlled by the particular battery cell control unit. For this purpose, they are preferably operated in a switching mode operation.

Switching mode operation of the semiconductor switch means that, in a switched-on mode, a very small electric resistance is provided between the connection terminals constituting the switching path, so that a higher current flow is possible for a very small residual voltage. In the switched-off state, the switching path of the semiconductor switch is high impedance; that is, it provides a high electric resistance, so that, even at higher voltage applied to the switching path, there is essentially no current flow or only a very small, in particular a negligible electric current flow. Differing from this is a linear operation, which, however, is not utilized as a rule for semiconductor switches.

The invention provides, first of all, that the states of charge of the battery cells that are electrically connected in parallel are determined. For this purpose, it is possible to provide a separate circuit for recording the state of charge, which determines either simultaneously or else selectively the states of charge of the battery cells. Furthermore, it is also possible, of course, to provide a battery cell control unit internal to the battery cell, which determines the respective state of charge of its battery cell. Preferably, the battery cell control units are in communications link with one another, in particular via a wireless connection, such as radio frequency, ultrasound, infrared, or the like. Of course, it is also possible to provide a wired connection, for example, by utilizing a communication network based on an interface protocol. Beyond this, it is possible to provide a battery management system, which is in connection with the battery cell control units and to which the states of charge of the respective battery cells are transmitted.

There then occurs a selection of those battery cells whose states of charge are to be adjusted. The selection occurs on the basis of a selection rule that can be predetermined. The selection rule can be, for example, a file, in which tables containing charge combinations of the battery cells are deposited and in which corresponding selections are associated with the charge combinations. If the battery cells whose states of charge are to be adjusted are selected, then, next, those battery cells are adjusted are activated and, namely, done so by switching on the respective semiconductor switch of the battery cells. The remaining battery cells are correspondingly deactivated by means of their semiconductor switches. The semiconductor switches are preferably arranged in the respective battery cells in an integrated manner.

The adjustment of the states of charge is carried out with the activation of the respective battery cells. In the process, preferably the states of charge are monitored. This can be realized, in turn, by means of the battery cell control units.

The adjustment of the states of charge is terminated when a predetermined state of charge has been attained by the activated battery cells. The adjustment preferably comprises a balancing of the states of charge of the activated battery cells. The termination can occur, for example, through the battery management system, but also through the battery cell control unit on the battery cell side. It has proven to be especially advantageous when the adjustment of the state of charges occurs on the battery cell side itself. The predetermined state of charge is preferably a state of charge in which the activated battery cells have essentially the same state of charge. However, there can also be a different state of charge, in particular when the activated battery cells have different construction designs or capacitances.

The method is not limited to the selective operation of two individual battery cells, but can also be applied to a plurality of battery cells, in particular simultaneously. It can be provided, for example, that a battery cell that is permanently switched on—for example, the battery cell that supplies the energy for the charge balancing and another battery cell that correspondingly takes up charge—is operated cyclically. As a result of this, it is possible to attain an especially high efficiency in regard to the charge balancing. Of course, this scenario can also be provided for conversely.

In accordance with a further development, it is provided that at least one of the semiconductor switches of an activated battery cell is operated cyclically. The cyclic operation is a special operating state of the switching mode operation, in which the transistor is switched on and off periodically or nonperiodically in accordance with a clock signal. The cyclic operation can provide that the semiconductor switch is switched on and off at a predetermined frequency. In the process, a duty cycle between a switched-on state and a switched-off state can be varied and can be adjusted depending on the state of charges and/or depending on a state of aging of the respective battery cell. Beyond this, there exists the possibility, of course, that, when the battery cells that are connected in parallel have a different capacitance, the duty cycle is adjusted in accordance with the respective capacitance differences.

In accordance with a further development, it is provided that, in the case of more than two activated battery cells, the semiconductor switches are operated by at least two battery cells in time-multiplex mode. This type of operation provides that at least two battery cells are not connected simultaneously to the other battery cells in an electrically conductive manner. As a result of this, it is possible overall to optimize further the energy distribution and the charge balancing. It is advantageous, for example, when a battery cell is utilized to charge two further battery cells as simultaneously as possible.

In accordance with a further embodiment, it is proposed that, by means of the adjustment of the states of charge, the states of charge of the battery cells are adjusted to a charge value for which the states of charge of these battery cell differ by less than a predeterminable value from one another, in particular deviate by less than 5 percent from one another. Preferably, first of all, a mean charge value is determined. To this end, the charge values of all battery cells are determined. This mean charge value can then be used as the basis on which to determine, by comparison of the respective individual charge values of the respective individual battery cells with the mean charge value, which of the respective battery cells are to be discharged or charged and how much charge is to be delivered or drained. The battery cells that have a higher charge value than the mean charge value can thereupon be discharged by transferring charge in accordance with the method according to the invention to battery cells that have a lower charge value than the previously determined mean charge value. This has proven especially advantageous when the deviation of the charge values of the individual battery cells is less than 5 percent. It is then possible to ensure a good operational readiness of the battery cells that comprise the battery.

A further embodiment of the invention provides that a state of aging of at least one of the battery cells is determined and the state of charge is adjusted taking into consideration the state of aging. For example, it can be provided that a currently available charge capacity of the battery cell is determined. This can be used as the basis for the determination of a current state of charges, which then serves overall for carrying out the method of the invention. As a result of this, it is possible to achieve an adjustment of the state of charges in a manner that is specific to the battery cells. Beyond this, it is possible to compare the available charge capacity with a capacity during start-up and/or with a manufacturer's value. The outcome of the comparison can further be adjusted, for example, for the adjustment of the state of charges. Furthermore, it is also possible to determine an internal resistance and to utilize the value thereof for carrying out the method. The value of the internal resistance can change and, in particular, increase with increased aging of the battery cell. Overall, it is possible in this way to reduce the demand placed on the respective battery cells as well as also to reduce any further aging.

It is further proposed that the functional readiness of at least one of the battery cells is determined and, in the event of a lack of functional readiness of the at least one battery cell, said battery cell is deactivated. As a result of this, it is possible to enable the battery cells comprising the battery to be operated further in emergency operation. Dangerous states during the intended operation can thereby be largely prevented.

Furthermore, it is proposed that the selection rule provides that, on the basis of a plurality of and preferably all battery cells, a mean charge value is determined and at least one battery cell with a greater charge value and one battery cell with a smaller charge value than the mean charge value are selected. This makes possible a further advantageous adaptation of the method of the invention.

Moreover, it is proposed that the semiconductor switches of the battery cells are operated taking into consideration non-electric physical parameters of the other battery cells. The non-electric physical parameters can be, for example, a pressure of the battery cell, a temperature of the battery cell, a specific gravity of an electrolyte of the battery cell, and/or the like. In this way, it is possible to improve further the reliability of the method of the invention and to utilize properties that are specific to the battery cells for optimization of the intended operation. For example, a cycle frequency or a duty cycle can be chosen depending on the parameters in order to be able to achieve an adjustment of the state of charges that is as effective as possible. For example, in the case of a cyclic operation, the duty cycle can be reduced with increasing temperature of a further activated battery cell.

BRIEF DESCRIPTION OF THE DRAWING

Further advantages and features ensue on the basis of the following description of an exemplary embodiment taking into consideration the appended figures. In the figures, identical reference signs refer to identical features and functions.

Shown are.

DETAILED DESCRIPTION OF THE DRAWING

Figure 1:
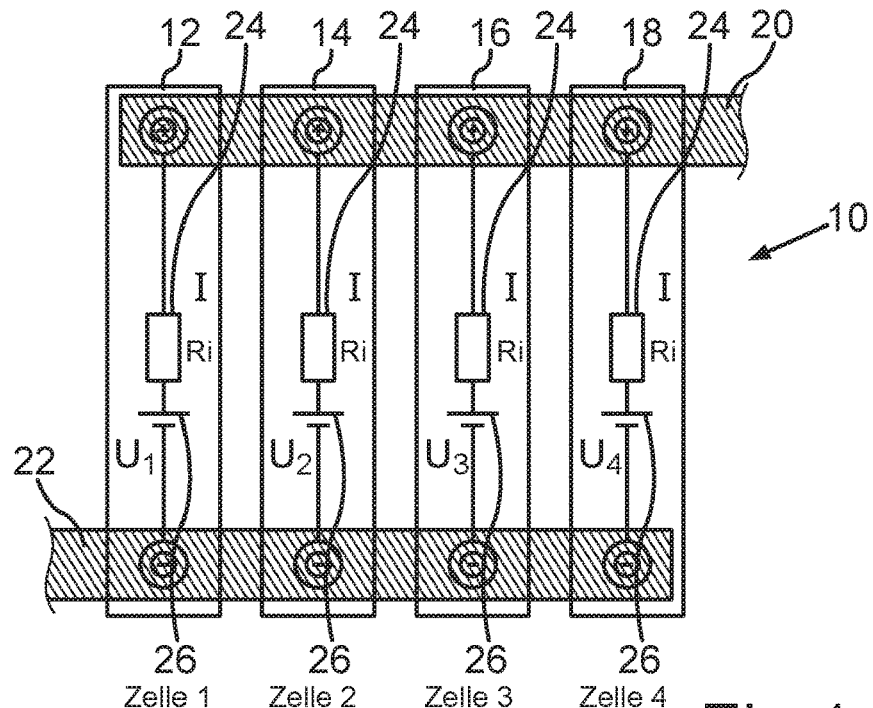
FIG. 1 in a schematic circuit diagram view, four battery cells, connected in parallel, of a battery in accordance with prior art, FIG. 2 four battery cells, connected in parallel, of a battery with integrated semiconductor switches in accordance with the invention, and FIG. 3 in a schematic circuit diagram illustration, a battery cell of the battery in accordance with FIG. 2.

FIG. 1 shows, in a schematic circuit diagram illustration, four battery cells 12, 14, 16, 18, connected in parallel, of a battery 10, with the plus poles thereof (not illustrated) being connected by means of a bus bar 20 in an electrically conductive manner. The minus poles of the battery cells 12, 14, 16, 18 are correspondingly connected to a bus bar 22 in an electrically conductive manner. Each of the battery cells 12, 14, 16, 18 has, as depicted schematically in a model illustration, an internal resistor 24 as well as a voltage source 26. The values for the internal resistor 24 and the voltage source 26 ensue on the basis of the electrochemical properties of the battery cells 12, 14, 16, 18 taking into consideration the respective design construction.

In the case of parallel connection of these battery cells 12, 14, 16, 18, slight differences in voltage of the voltage sources 26 already suffice to enable large compensating currents to flow during installation. This can not only result in dangerous states, but leads, moreover, to an unequal demand being placed on the battery cells 12, 14, 16, 18, so that the battery 10 cannot supply the optimally possible operational readiness that it would provide if the battery cells 12, 14, 16, 18 had identical physical properties.

In particular, on account of the parallel connection and the only slightly deviating physical properties, a non-uniform state of charge of the battery cells 12, 14, 16, 18 is established. This leads to a non-uniform load during intended operation of the battery 10. An increased aging and a potential overload of battery cells that are weaker in power are possible. Overall, the performance and the lifetime are reduced.

Figure 2:
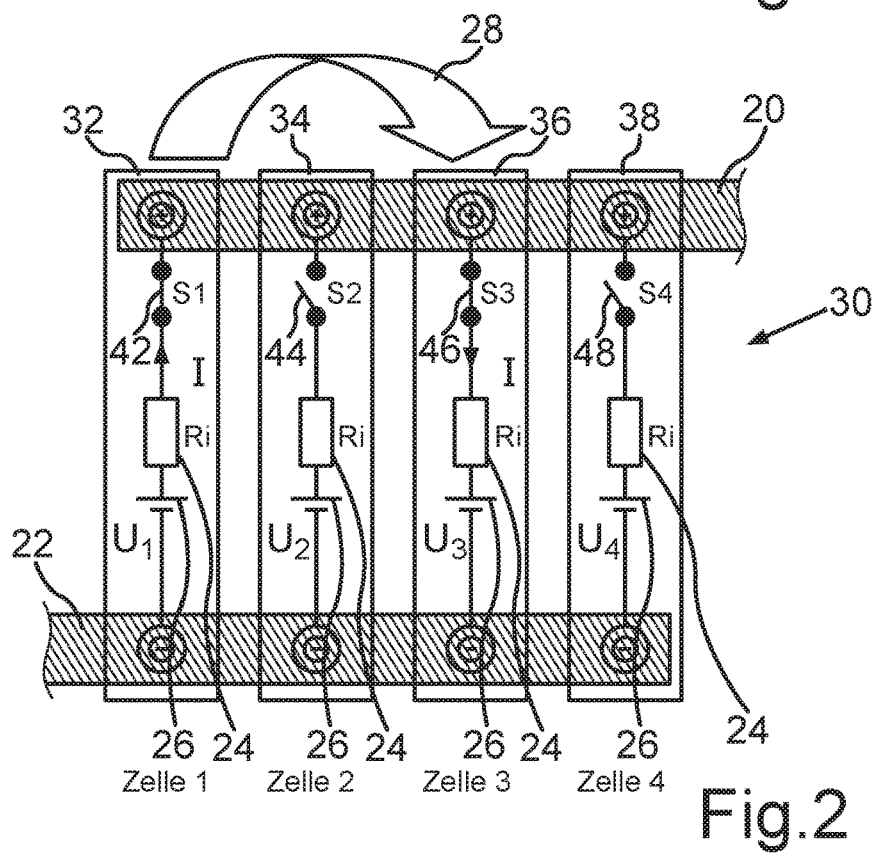

FIG. 2 then shows a battery 30 with battery cells 32, 34, 36, 38 in accordance with the invention, which are connected in parallel. The plus poles of the battery cells 32, 34, 36, 38 are again connected by means of a bus bar 20 in an electrically conductive manner. Correspondingly, the minus poles of the battery cells 32, 34, 36, 38 are connected by means of a bus bar 22 in an electrically conductive manner. Here, too, electric internal resistors 24 as well as voltage sources 26 are provided in each of the battery cells 32, 34, 36, 38, and, as explained in FIG. 1, model the function of the respective battery cell 32, 34, 36, 38.

Additionally connected in the battery cells 32, 34, 36, 38 in series to the internal resistors 24 and voltage sources 26 are semiconductor switches 42, 44, 46, 48, by means of which the respective battery cell 32, 34, 36, 38 can be activated or deactivated. For this purpose, the semiconductor switches 42, 44, 46, 48 are operated in switching mode operation. As a result of this, it is possible to activate selectively the battery cells 32, 34, 36, 38. The semiconductor switches 42, 44, 46, 48 are arranged in the respective battery cells 32, 34, 36, 38 in an integrated manner.

Figure 3:
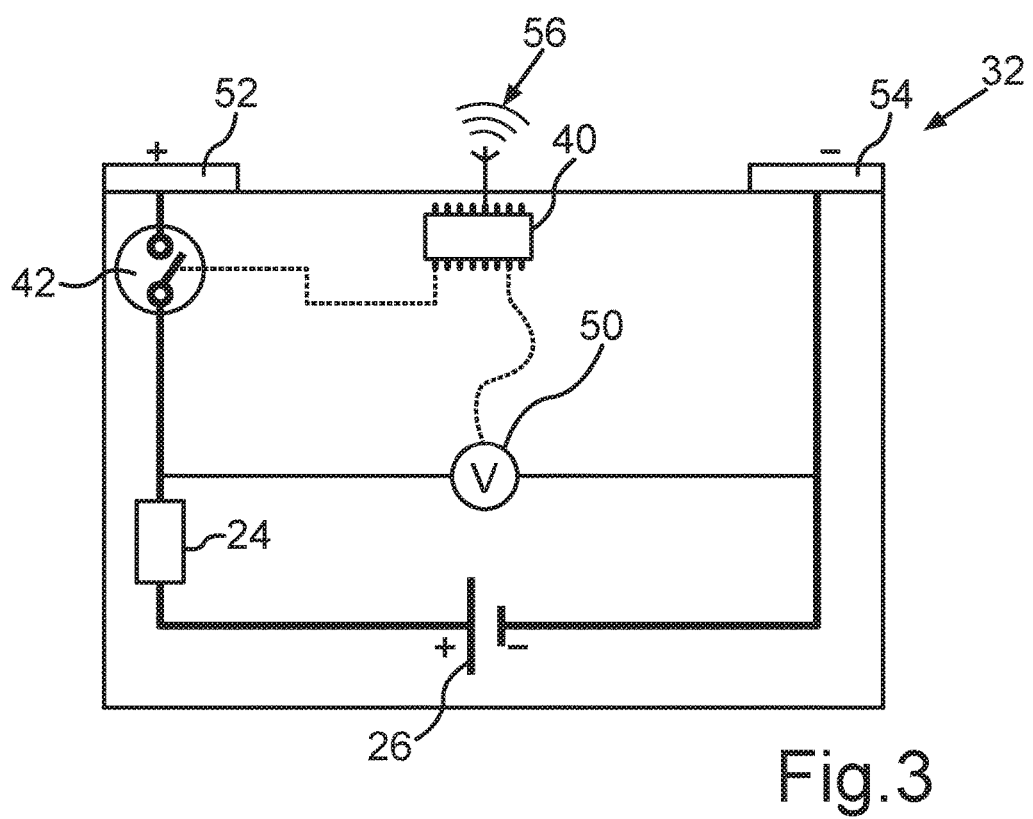

An enlarged illustration, in schematic circuit diagram view, of an individual battery cell—in the present case the battery cell 32—is shown in FIG. 3. As can be seen in FIG. 3, the battery cell 32 has the voltage source 26, the internal resistor 24, and the semiconductor switch 42, connected in series. This series circuit is connected to a negative connection terminal contact 54 as well as to a positive connection terminal contact 52 and, namely in such a way that a direct current electric voltage is present between the connection terminal contacts 52, 54.

It can further be seen in FIG. 3 that the battery cell 32 has a battery cell control unit 40, which is connected to a voltage sensor unit 50. The other battery cells also have a battery cell control unit 40 and a voltage sensor unit 50. It is possible by means of the voltage sensor unit 50 to determine the voltage at the connection terminal contacts 52, 54. The battery cell control unit 40 further comprises a driver switch, which is not illustrated separately, and which is connected to the semiconductor switch 42. The driver switch serves for control of the semiconductor switch 42 in switching mode operation. The battery cell control unit 40 further has a transmitting/receiving unit 56, by means of which it can make a communications link to other battery cell control units of the battery cells 34, 36, 38. Furthermore, by means of the transmitting/receiving unit 56, it can make a communications link to a battery management system, which is not illustrated. In the present case, it is provided that the communications links are made wirelessly on a radio frequency basis.

In the present case, the semiconductor switch 42 is formed by two antiserially connected MOSFETs, which, as needed, are controlled by the driver switch of the battery cell control unit 40. As a result of this, it is possible to activate or deactivate the battery cell 32.

It can be seen further from FIG. 2 that, in the currently illustrated situation, the semiconductor switches 42 and 46 are closed, whereas the semiconductor switches 44 and 48 are open. The battery cells 34 and 38 are accordingly deactivated. In contrast to this, the battery cells 32 and 36 are activated as battery cells that have been selected according to a selection rule.

In the present case, a voltage $U_1$ of the voltage source 26 of the battery cell 32 is greater than a voltage $U_3$ of the voltage source 26 of the battery cell 36. In this case, the selection rule provides that a no-load voltage of the battery cells is taken into account. The no-load voltage can represent a measure of the state of charge. In this way, it is possible to accomplish an energy balancing by activation of the battery cells 32 and 36. For this purpose, a switching algorithm can be deposited in the respective battery cell control units 40, by means of which the semiconductor switches 42, 46 are operated in cyclic operation in order to make possible an energy balancing that is as low in demand as possible.

In prior art, a very large pulsed current would flow immediately when the electrically conductive connection between the battery cells 32, 36 is made. This load can be reduced by means of a corresponding cyclic operation of the semiconductor switches 42 and/or 46. To this end, it is possible to operate at least one of the semiconductor switches in cyclic operation, whereas the other semiconductor switch is switched on permanently. Through suitable cycling, a smooth charge transfer from the battery cell 32 to the battery cell 36 occurs. Once the charge balancing has subsided, the other battery cells 34, 38 can be activated additionally by switching on their semiconductor switches 44, 48, so that the battery 30 is available for its intended operation. The cyclic operation can be terminated and the semiconductor switch of the battery cells can be permanently switched on.

As a result of the fact that each of the battery cells 32, 34, 36, 38 has a battery cell control unit 40, it is possible to take into consideration further parameters in order to adjust the respective state of charge. For example, it is possible to take into account a history in relation to the state of charges, a maximum current load, a maximum thermal load, and/or the like. As a result of this, it is possible to achieve preferably an individual adjustment of the state of charges for each battery cell, so that an operation that is as reliable as possible and requires as little servicing as possible can be achieved.

Furthermore, there exists the possibility, through deliberate activation or deactivation of individual battery cells, to increase appropriately the overall performance or the lifetime of the battery 30. In particular, in the event of a failure of a battery cell, it is possible to switch it off by means of its respective semiconductor switch, so that an emergency operation can be realized. Beyond this, it is hereby possible to prevent dangerous states.

Even though the invention has been explained on the basis of batteries of motor vehicles, it is clear to the person skilled in the art that the application of the invention is not limited to these applications. The invention can also be utilized, of course, in stationary electrical systems, in particular also in the field of electric switching systems. The advantage in accordance with the invention is manifested especially in this case, in particular when the invention is employed for interruption-free energy supply, in particular for functions relevant to safety. This is especially of great advantage in signal technology or in communications technology.

The description of the exemplary embodiments serves solely for explanation of the invention and is not limited to said embodiments.

The advantages and features described for the device according to the invention and for the motor vehicle according to the invention as well as the embodiments apply equally to the corresponding method and vice versa. Consequently, corresponding method features can be provided for device features and vice versa.

The invention claimed is:

1. A method for the adjustment of states of charge of battery cells, comprising:
    determination of the states of charge of the battery cells that are operated electrically in parallel connection;
    selection of those battery cells whose states of charge are to be adjusted in accordance with a predeterminable selection rule;
    activation of those battery cells that are adjusted by means of a respective semiconductor switch of the battery cells and deactivation of the remaining battery cells by means of the semiconductor switches of the respective remaining battery cells;
    carrying out the adjustment of the states of charge and monitoring the states of charge; and
    termination of the adjustment of the states of charge when a predetermined state of charge has been attained by the activated battery cells.

2. The method according to claim 1, wherein at least one of the semiconductor switches of an activated battery cell is operated cyclically.

3. The method according to claim 1, wherein, in the case of more than two activated battery cells, the semiconductor switches are operated by at least two battery cells in time-multiplex mode.

4. The method according to claim 1, wherein, with the adjustment of the states of charge, the states of charge of the battery cells are adjusted to a charge value at which the states of charge of said battery cells differ by less than a predeterminable value from one another, in particular deviate by less than 5% from one another.

5. The method according to claim 1, wherein a state of aging of at least one of the battery cells is determined and the state of charge is adjusted taking into consideration the state of aging.

6. The method according to claim 1, wherein a functional readiness of at least one of the battery cells is determined and, in the event of a lack of functional readiness of the at least one battery cell, said battery cell is deactivated.

7. The method according to claim 1, wherein the selection rule provides that, based on all battery cells, a mean charge value is determined, and at least one battery cell with a greater charge value and one battery cell with a smaller charge value is selected as the mean charge value.

8. The method according to claim 1, wherein the semiconductor switches of the battery cells taking into consideration non-electrical physical parameters of the other battery cells.

9. A battery, in particular for utilization in a motor vehicle, comprising:
    a plurality of battery cells that are electrically connected in parallel,
    wherein the battery has a device for the adjustment of states of charge of the battery cells, which is designed to determine the states of charge of the battery cells, to select those battery cells whose states of charge are to be adjusted in accordance with a predeterminable selection rule, to activate those battery cells whose states of charge are to be adjusted by means of a respective semiconductor switch of the battery cells, and to deactivate the remaining battery cells by means of the semiconductor switches of the respective remaining battery cells, to carry out the adjustment of the states of charge and to monitor the states of charge, and to terminate the adjustment of the states of charge when a predetermined state of charge has been attained by the activated battery cells.

* * * * *